(12) United States Patent
Saiz

(10) Patent No.: US 12,240,504 B2
(45) Date of Patent: Mar. 4, 2025

(54) ULTRALIGHT TWO-TRACK TRAIN THAT DOES NOT DERAIL

(71) Applicant: Manuel Munoz Saiz, Almeria (ES)

(72) Inventor: Manuel Munoz Saiz, Almeria (ES)

( * ) Notice: Subject to any disclaimer, the term of this patent is extended or adjusted under 35 U.S.C. 154(b) by 917 days.

(21) Appl. No.: 17/192,347

(22) Filed: Mar. 4, 2021

(65) Prior Publication Data

US 2021/0188330 A1 Jun. 24, 2021

Related U.S. Application Data

(63) Continuation of application No. PCT/ES2019/000057, filed on Sep. 10, 2019.

(30) Foreign Application Priority Data

| Sep. 10, 2018 | (ES) | ES201800543U |
| Dec. 19, 2018 | (ES) | ES201900002U |
| Sep. 9, 2019  | (ES) | ES201900429U |

(51) Int. Cl.
*B61F 9/00* (2006.01)
*B60B 19/00* (2006.01)
(Continued)

(52) U.S. Cl.
CPC ............ *B61F 9/005* (2013.01); *B60B 19/006* (2013.01); *B61B 13/00* (2013.01); *B61C 3/00* (2013.01);
(Continued)

(58) Field of Classification Search
CPC ....... B60B 19/006; B61B 13/00; B61B 13/08; B61B 13/12; B61B 13/127; B61C 3/00;
(Continued)

(56) References Cited

U.S. PATENT DOCUMENTS

| 6,237,499 B1 * | 5/2001 | McKoy | B63B 1/16 |
| | | | 104/70 |
| 2009/0095192 A1 * | 4/2009 | Roop | B61B 13/04 |
| | | | 104/293 |
| 2018/0178816 A1 * | 6/2018 | Jacob | E01B 25/26 |

FOREIGN PATENT DOCUMENTS

| EP | 2832622 A1 * | 2/2015 | B61F 9/00 |
| WO | WO-2013061263 A1 * | 5/2013 | B61F 9/00 |

* cited by examiner

*Primary Examiner* — Robert J McCarry, Jr.
(74) *Attorney, Agent, or Firm* — Robert M. Schwartz; Alfred K. Dassler

(57) ABSTRACT

The ultralight two track train that does not derail, made up of one or more ultralight wagons and aerodynamic, oval or semi-oval transverse profiles, characterized in that the wagons carry vertical or inclined wheels or pulley wheels in their lower area and supported by the chassis of the wagons, which rest and roll on a pair of vertical or inclined rails, the channels of the pulley wheels are supported and held on the head of circular, semicircular or semi-oval section of the rails, the heads of the rails being trapped with the pulley wheels, adding pairs of wheels that use a common axis, the rails are coupled and fixed tongue and groove to the sleepers or to some monolithic structures or channels, the sleepers are fixed using the track system on concrete slab, using electrical supply means, propellant means and reducing means of the front, rear and lateral resistance of the wagons, adding wheels with permanent magnets or with electromagnets that are attached, or run close and attracted by the rails.

11 Claims, 14 Drawing Sheets

(51) Int. Cl.
*B61B 13/00* (2006.01)
*B61C 3/00* (2006.01)
*B61C 17/06* (2006.01)
*B61D 1/00* (2006.01)
*B61D 17/02* (2006.01)
*B61D 17/04* (2006.01)
*B61F 5/30* (2006.01)
*B61F 15/20* (2006.01)

(52) U.S. Cl.
CPC ................ *B61C 17/06* (2013.01); *B61D 1/00* (2013.01); *B61D 17/02* (2013.01); *B61D 17/041* (2013.01); *B61F 5/307* (2013.01); *B61F 15/20* (2013.01)

(58) Field of Classification Search
CPC .......... B61C 17/06; B61D 1/00; B61D 17/02; B61D 17/041; B61F 5/307; B61F 9/005; B61F 15/20
See application file for complete search history.

ULTRALIGHT TWO-TRACK TRAIN THAT DOES NOT DERAIL

INDEX TO RELATED APPLICATIONS

This application claims the benefit of PCT application PCT/ES2019/000057 filed Sep. 10, 2019, which claims benefit of Spanish patent application numbers, U201800543 filed Sep. 10, 2018, U201900002 filed Dec. 19, 2018, and U201900429 filed Sep. 9, 2019, the disclosures of which are incorporated herein by reference in their entirety.

FIELD OF THE INVENTION

In land transport vehicles, amusement parks, toys, and especially in high-speed trains.

STATE OF THE ART

The current experimental levitation systems, such as the maglev, use excessively expensive railway tracks, their operation is very complex and they need an enormous amount of energy for their displacement, which makes them impractical, being confined to the experimental field. Conventional trains are excessively heavy, producing high friction and high power consumption. The airplanes do not have rolling friction, although if by air, and the energetic cost is high. The present invention solves said problems, using ultralight trains, and simple and inexpensive tracks.

DESCRIPTION OF THE INVENTION

Objective of the Invention and Advantages

To provide a simple, economical, practical, that does not derail, safe, aerodynamic and low maintenance train, which by saving energy reduces pollution and protects the environment.

Use an ultralight train, very light weight per meter in length, which results in cheaper tracks and a lower total cost of the system, which together with the reduction of aerodynamic drag and friction, provide great energy savings and allows high speeds.

To use a system that does not derail and does need, as in the current trains, a great weight to avoid its derailment, which produces a great friction. Thing that does not happen with the present system.

To be able to use wagons with a monocoque fuselage open in its lower area.

Use a lightweight low-height train with an aerodynamic or oval cross section and slightly flattened, which is less affected by the lateral wind Use cushioning of rubber, pneumatic, strapping or coil springs.

The bearings can be of air or magnetic and between the wheels and the rails air jets can be applied that try to avoid that these one contacts with the rails.

Use a rail temperature regulation system that prevents its expansion or contraction. This is especially useful on continuous rail tracks or without splices.

Use an elastic, cushioned, simple and safe rail fixing system, although you can use the existing systems: Embedded track, Direct support, Indirect support, Blocks covered with elastomers, Monolithic with sleepers, Sleepers covered with elastomer, Sleepers on slab. Floating slab with sleepers, slabs on non-elastic mortar and floating slab without sleepers.

Instead of the sleepers, it can carry a monolithic structure or channel with a U-shaped, rectangular or trapezoid open at the top section, with vertical or inclined lateral ends supporting the rails.

Damping prevents or reduces vertical and horizontal oscillations.

To be able to develop high speeds, competing with airplanes in medium distances, not having competition in the short ones, being able to reach between 600 and 1000 km/h. The TGV has reached a speed of 574.8 km/h. but only for a moment and without security.

To use complementary alternative energies: wind and solar to power the vehicles electrically, energy that is stored in batteries. The energy of which is transformed into alternate current to supply it to the train.

For toys you can add a remote radio-control system.

Without competition in Speed, Safety, Comfortable, Low weight, Simplicity, Minimal frontal, rear and friction resistance, Minimum power consumption in the propulsion, Performance, Cost per kg. transported, Easily climb the slopes, Transport very ecological, does not pollute, or produce $CO_2$, and competes with trains and aircrafts.

Current Technical Problem

Current trains need expensive tracks, great weight to adapt or adhere to them and avoid derailment, they do not acquire very high speeds, they are very affected by the lateral wind, the external electrical energy is applied with difficulty, the frontal, posterior and lateral resistance are very high, have great power consumption, and therefore are not very ecological. It can be said that they are not up to date with respect to other technological advances. The present invention solves said problems.

The ultralight two track train that does not derail, consists of a train with one or more ultralight and aerodynamic profiles wagons of oval or semi-oval cross section, with inclined pulley wheels in its lower area and supported by the chassis of the wagons, which use independent axes and rest and roll on a pair of vertical or inclined rails. Being able to use the pulley wheels whose channels are supported on the head of circular, semicircular or semioval cross-section of the rails.

They can use pairs of wheels joined by an axle and standard wheels and rails. The wheels pulleys or the heads of the rails are trapped. The rails are coupled and fixed to the tongue and groove sleepers, and a steel plate or an elastomer is added between them. The tongue and groove is effective enough to avoid getting out of its housing but allows it to be dismantled or removed using levers with nails at its ends. The sleepers are fixed using the track system in (or on) concrete slab, which is a type of railway that has a high quality, reducing maintenance costs. Its placement is made without ballast and consists of a concrete plate that transmits to the platform tensions uniformly distributed and of lower value than with ballast. (The system could also be made with lag screws and on ballast). The wheels can be free or driven, in the first case it would only be propelled by the fans.

Some stop wheels run perpendicular or inclined under the side of the rail heads avoiding derailment, they can also warn when contacting the head that the wagon has been raised excessively.

Optionally, the front and rear resistance can be eliminated using fans or turbines, which suck the air in the front area of the front wagon and others unload it after the last wagon. In this case the vehicle does not press on the air and can be considered that the front fans act by traction. The lateral friction is reduced by coating with a sliding layer, with a surface covered with multiple denticles or using double walls and between them a pressurized chamber whose air is discharged to the outside with multiple tiny bubbles avoiding the adherence of the laminar flow.

The track on concrete slab, improves the quality of the track and reduces the excessive maintenance cost.

With the head of the rails or their hollow souls, the circulation of a cold or hot gas or liquid fluid is allowed to maintain the temperature of the rails and prevent their expansion or contraction respectively. The circulation of temperature regulating fluid can also be achieved by attaching a conduit to the rail, which carries the regulating fluid.

Fat boxes, bearings and preferably air or magnetic bearings are used to support the axles of the wheels. The latter, together with the low weight of the wagons, produce very low friction and therefore low power consumption. Monocoque wagons can be used.

The wagons are of greater length than the typical lengths of the current wagons, or of greater relation length width of the same ones and very light of weight, using carbon or glass fibre, or alloys of aluminium, magnesium, etc. in this way the weight per meter is minimal and therefore that of the tracks, which is also reduced by separating the passenger rows, each other. You can reduce the weight by using two or three seats per row. For this reason and due to the lower friction resistance, the energy required for propulsion is very small.

The tracks can be made of stainless steel, with the head of the rail or the raceway hardened. They can also be made of ferromagnetic material and use magnetic or electromagnetic wheels, which attract the wagons against the rails to avoid or reduce their tendency to separate from each other. Those with electromagnets can be supplied with a variable current depending on the separation or danger in the area. In a variant, the electromagnets are fed sequentially, attracting only those in the advance zone, allowing the wheel to advance and rotate. A rotating magnetic flux can also be applied with electromagnets.

The rails can be embedded in slots that carry the sleepers, in a tight or with a clearance that facilitates the introduction of an elastomer, adhesive, elastic mortar or complementary metal plates and adjust the rail to its correct position.

The rails can carry on one side triangular projections on both sides, which are housed and hooked on lateral subchannels that the sleeper channels carry for the rails to be housed. Blocking or partially fixing the rails in their housings. They allow with a small effort the dismantling of the same ones.

You can use a system of fixation of the rails, elastic, cushioned, simple and safe, using track in concrete plate, you can also use the existing systems of: Embedded Track, Direct Support, Indirect support, blocks covered with elastomers, monolithic with sleepers, sleepers covered with elastomer, sleepers on slab, floating slab with sleepers, slabs on non-elastic mortar and floating slab without sleepers.

The sleepers will preferably be pre-stressed concrete monoblock type or two-block prestressed concrete joined together by a steel strut.

The propulsion is achieved using electric motors or explosion, gasoline, diesel engines or fans. The electric motors can be applied directly to the wheels and are powered by batteries, fuel cells or electric current applied from the ground can be picked up and sent through the rails, or by large fixed plates that act as capacitors with others in the lower or side area of the wagons. The rails can be ground or a second plate can be used for it. Applied alternating current has a relatively high frequency and voltage to allow its circulation through the capacitors. The external electrical energy is applied in multiple sections with independent generators.

Alternatively, the suction and impulsion made by the fans can be used.

The wheels have a deep throat, which contributes along with the inclination of the same and the rails to avoid derailment. In addition to the traditional mechanical damping, with springs helical or strapping, pneumatic or oleo-pneumatic damping can be used. A rubber cover or an elastomer may also be used around the axes or bearings that support the ends of the axles, on their covers or on the supporting elements thereof. The weight of the wagons can be balanced by a water or fuel installation, pumping the liquid automatically when there is imbalance.

Due to its high speed, it is necessary to avoid tight curves, and for this reason, in many cases, it must be buried underground or on bridges. When possible, the stops are used to make changes of direction and avoid curves.

The rails and bolts can be fastened with the systems of elastic clips or current springs that prevent their loosening.

DETAILED DESCRIPTION OF A FORM OF EMBODIMENT OF THE INVENTION

Figure 1:
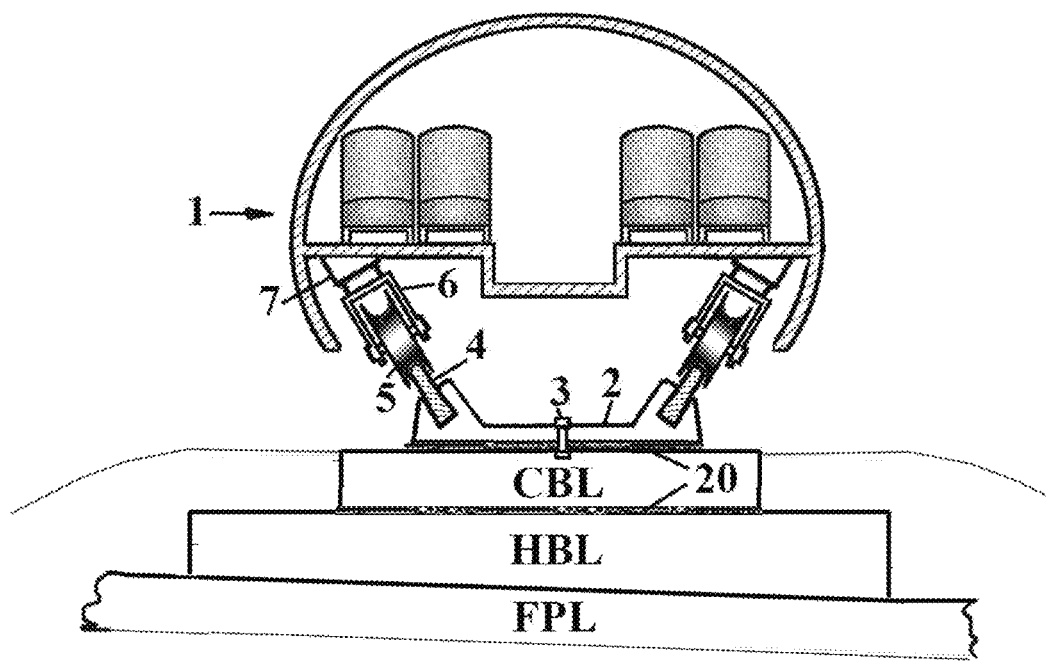
FIG. 1 shows a schematic and partially cross-section view of a wagon and track with the system of the invention.

FIG. 1 shows an embodiment of the invention, with the wagon (1) of an ultralight train, which uses on the sleepers (2) two rails (4) on which the throats of the inclined pulley wheel are supported (5). Each of the pulley wheel are held independently by the support forks (6), whose rod or plunger is inserted in the damper (7). Using the Züblin system, the sleepers are attached to the main plate (CBL) and optionally to the base plate (HBL) placed on the antifreeze protection layer (FPL) with the lag screws (3). The connection between the main plate (CBL) and the sleepers and the base plate (HBL) can be damped with a layer (20) between them. Any other fastening system with the plates can be used. The damping can also be of any other known type.

In all cases the axes of the wheels-pulleys support or rest on bearings or gears, but for high speeds it is preferable the fat boxes and even better the air or magnetic bearings, given the little weight that the wagons have.

Figure 2:
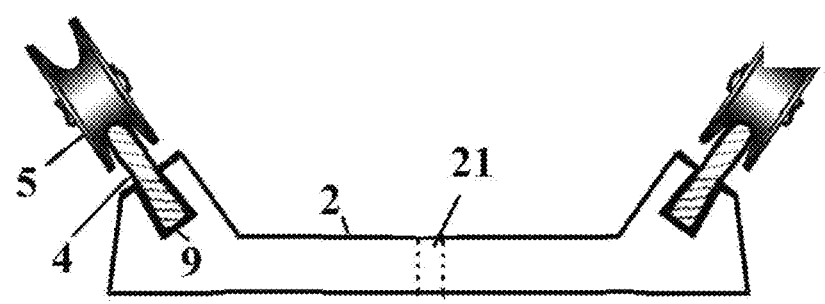
FIG. 2 shows a schematic view and partially cross-sectioned of a single-piece sleeper with two rails and wheels inclined towards the lower central zone.

FIG. 2 shows the sleeper monoblock (2), at whose ends upper zone that tongue and groove with inclined the rails (4) with rounded or semicircular head and on which rest the pulley wheel (5). The holes (21) are for placing the lag screws. The channels where the rails are inserted are covered by a metal plate (9) of reinforcement.

Figure 3:
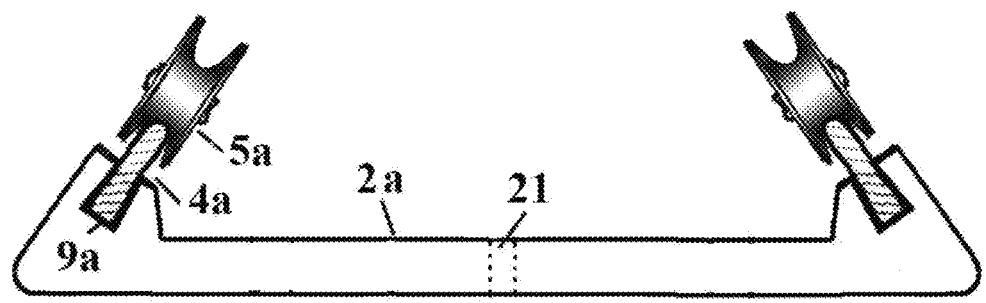
FIG. 3 shows a schematic and partially cross-section view of a single-piece sleeper with two rails and wheels inclined towards the upper central area.

FIG. 3 shows the monobloc sleeper (2a), in whose upper area the rails (4a) with a rounded head are tongue and groove with and inclined and on which the pulley wheels (5a) rest. The holes (21) are for placing the lag screws. The channels where the rails are inserted are covered by a metal plate (9a) of reinforcement.

Figure 4:
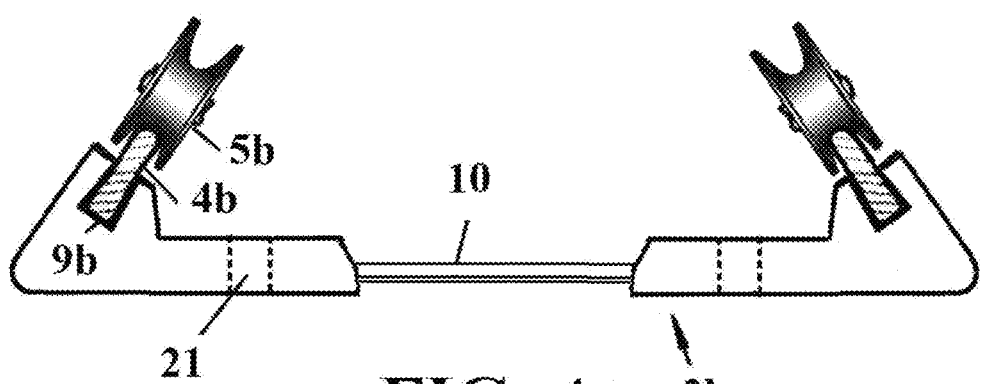
FIG. 4 shows a schematic and partially cross-sectioned of a crossbeam joined by a bar or steel brace, with both rails and wheels inclined towards the upper central area.

FIG. 4 shows the sleeper of two blocks (2b) joined by the strut of laminated steel (10), in whose upper area the rails (4b) with rounded or semicircular head are tongue and groove with and inclined and on which the pulley wheels rest (5b). The holes (21) are for placing the lag screws. The channels where the rails are inserted are covered by a metal plate (9a) of reinforcement.

Figure 5:
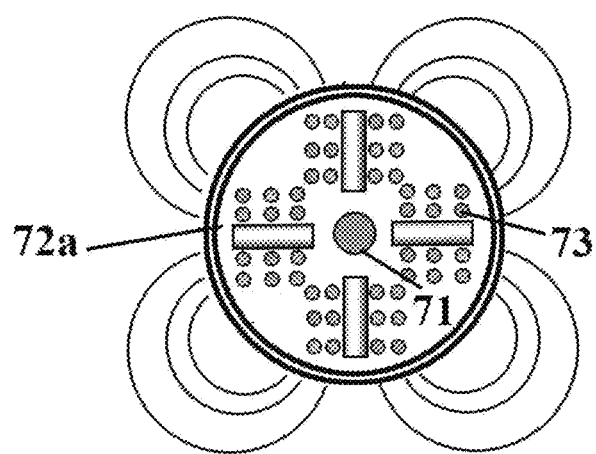
FIGS. 5 to 9 show schematic and partially sectioned views of wheels with variants of electromagnets arranged in different ways. These and those with permanent magnets can contact the rails or run with a small gap with them.
Figure 6:
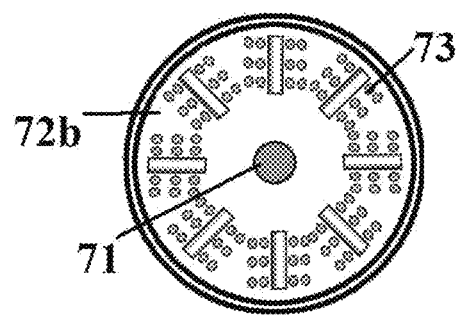
Figure 7:
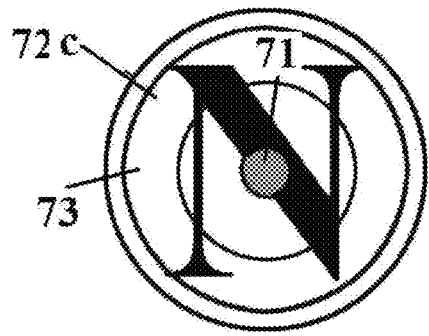

FIG. 5 shows the wheel (72a) formed by four electromagnets (73) arranged radially, this idler wheel rotates on the rail around the axis (71) producing the magnetic attraction on the rails, by means of the electromagnet, which passes through its proximity FIG. 6 shows the wheel (72b) formed by multiple electromagnets (73) arranged radially, this idler wheel rotates on the rail around the axis (71) producing the magnetic attraction on the rails, by means of the electromagnet, which passes through its proximity FIG. 7 shows the wheel (72c) with an electromagnet (73) whose only coil coincides with the axis of rotation (71) and whose attraction collaborates with the pulley wheels in the anti-slip protection.

Figure 8:
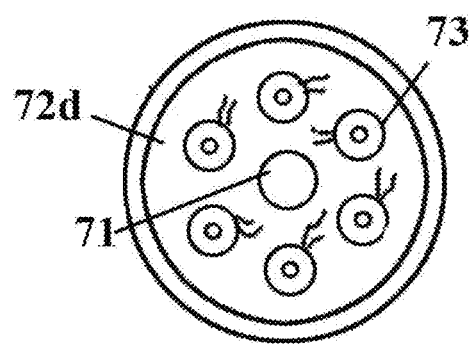
Figure 9:
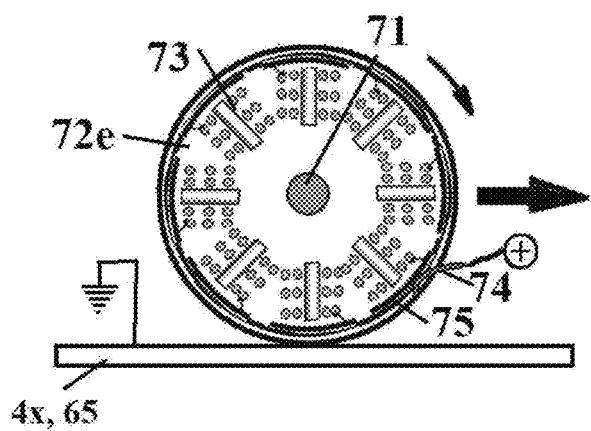
Figure 10:
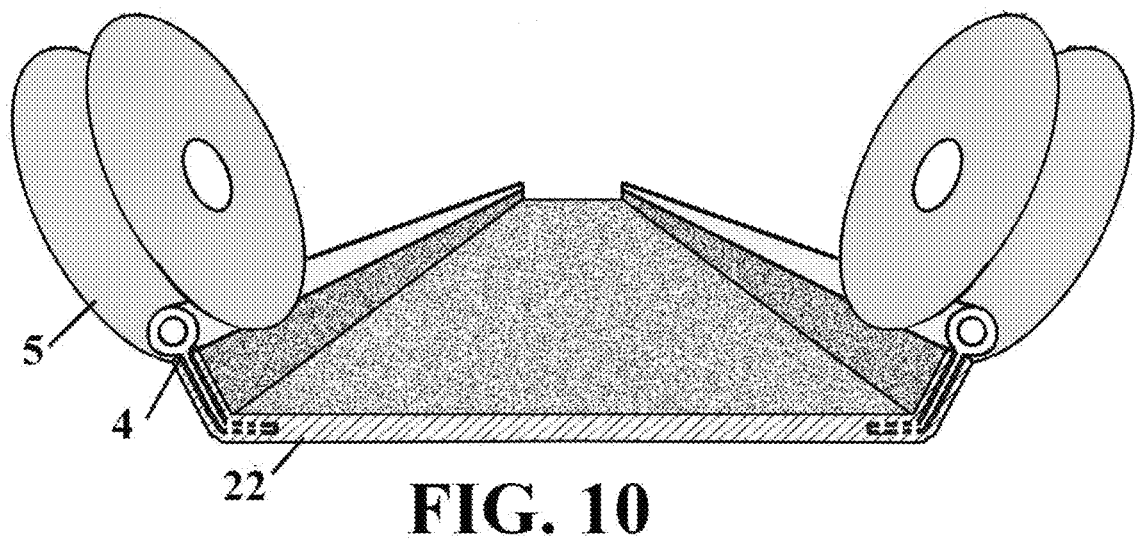
FIG. 10 is a schematic and perspective view of a partially cross sectioned monolithic channel-like structure portion of a sleeper variant with the support wheels.

FIG. 8 shows the wheel (72d) formed by multiple electromagnets (73) arranged parallel to the axis, this wheel rotates idly on the rail around the axis (71) producing magnetically attraction on the rails, feeding the electromagnet, which passes through its proximity. FIG. 9 shows the wheel (72e) formed by multiple electromagnets (73) arranged radially. It rotates crazy around the axis (71) producing the magnetic attraction on the rail (4x, 65), by means of the electromagnets (73), sequentially with the brush (74) that applies the current to each of the electromagnet coils that pass through that area, applying it to the strips or sliding plates (75), the circuit closes through the wheel and the rail to ground FIG. 10 shows the monolithic structure or channel (22) with the rails (4) and the pulley wheels (5).

Figure 11:
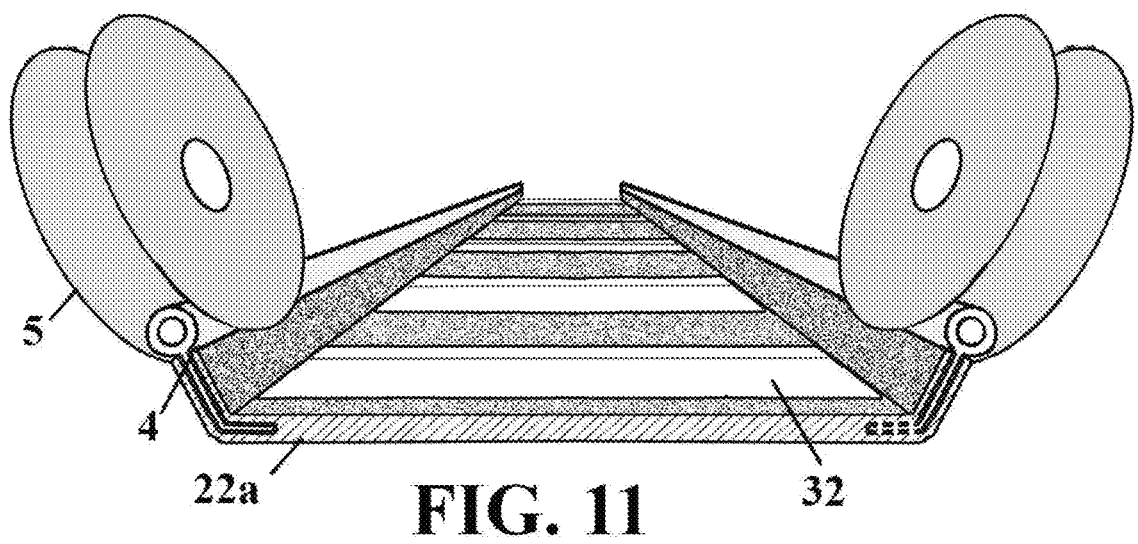
FIG. 11 shows a schematic and perspective view of a partially cross-sectioned monolithic channel structure portion with hollows that determine sleepers in its lower zone, of a sleeper variant with the support wheels.

FIG. 11 shows the structure or monolithic channel (22a) with its bottom formed by sleepers generated when creating the cavities (32), with the rails (4) and the pulley wheels (5).

Figure 12:
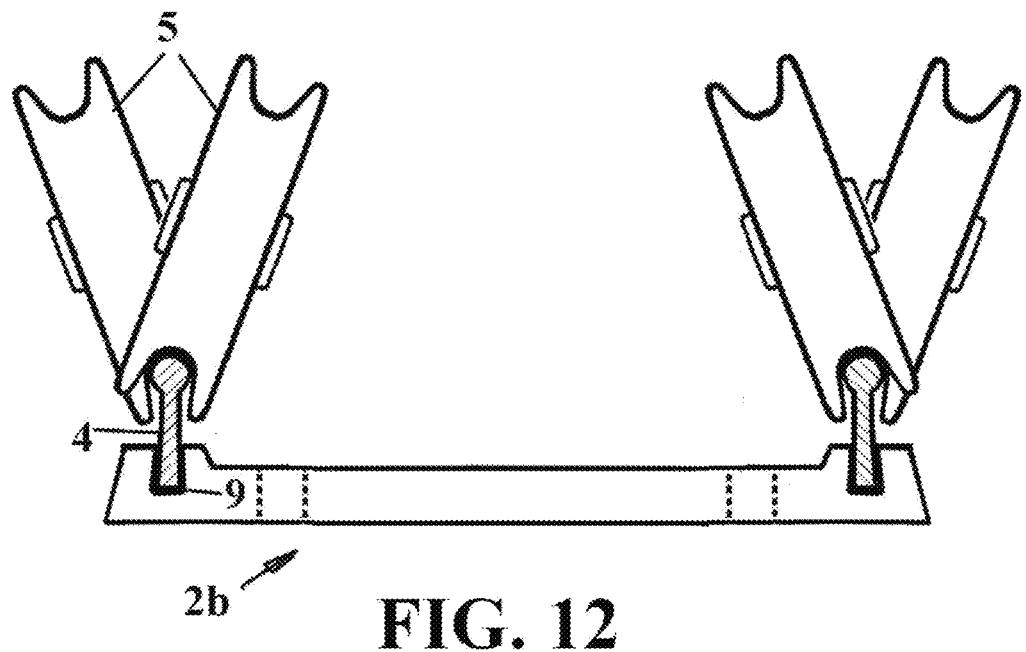
FIG. 12 shows a variant of single piece sleeper with vertical rails and pulleys inclined on both sides.

FIG. 12 shows the monoblock sleeper (2b), the pulley wheels (5) and the cylindrical head rails, tongue and groove with the sleepers in holes reinforced with metal parts (9).

Figure 13:
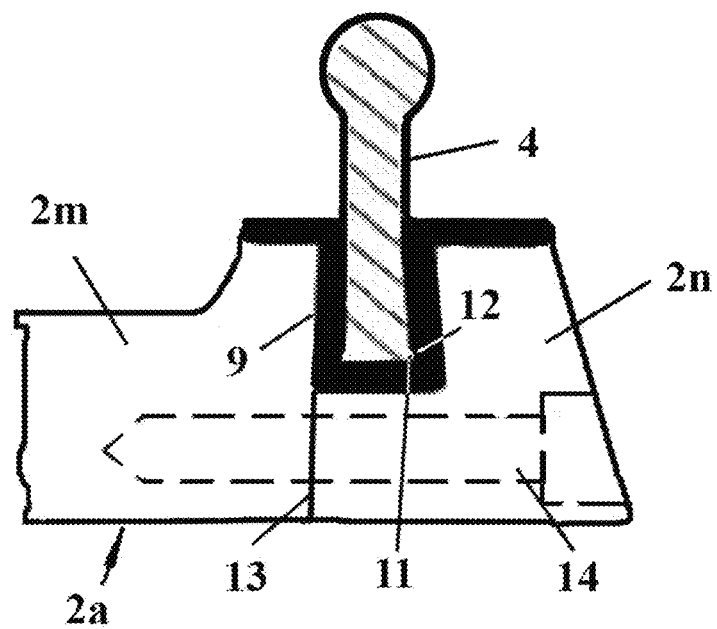
FIG. 13 shows a perspective view of a three-piece sleeper portion used to replace deteriorated sleepers and a vertical rail as in FIG. 12.

FIG. 13 shows a schematic view of a sleeper portion (2a) subdivided into three parts, (2n) of the ends that are coupled to the central portion (2m) by means of a lag screw that is introduced into the channel (14), which part of both subdivision. The separation line between both is (13). The rail carries in one on both sides projections (11), which are housed and hooked in lateral sub-channels (12) that the sleeper channels carry for the housing of the rails. In the housing of the rail in the sleeper carries a reinforcement plate (9). It is used to replace a damaged sleeper. The piece (2n) can be larger for greater consistency.

Figure 14:
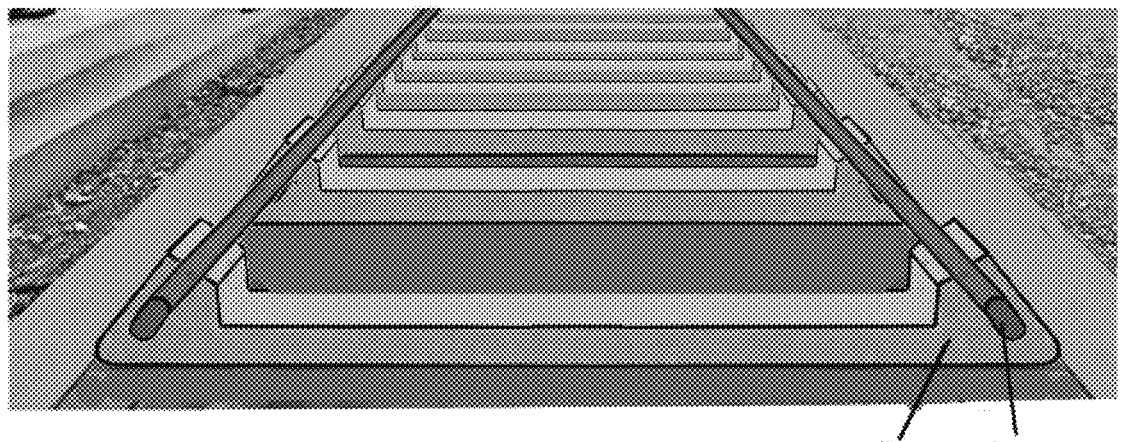
FIG. 14 shows a perspective view of a track formed by multiple single-piece sleepers.

FIG. 14 shows the single-piece sleepers (2a) and the rails (4a).

Figure 15:
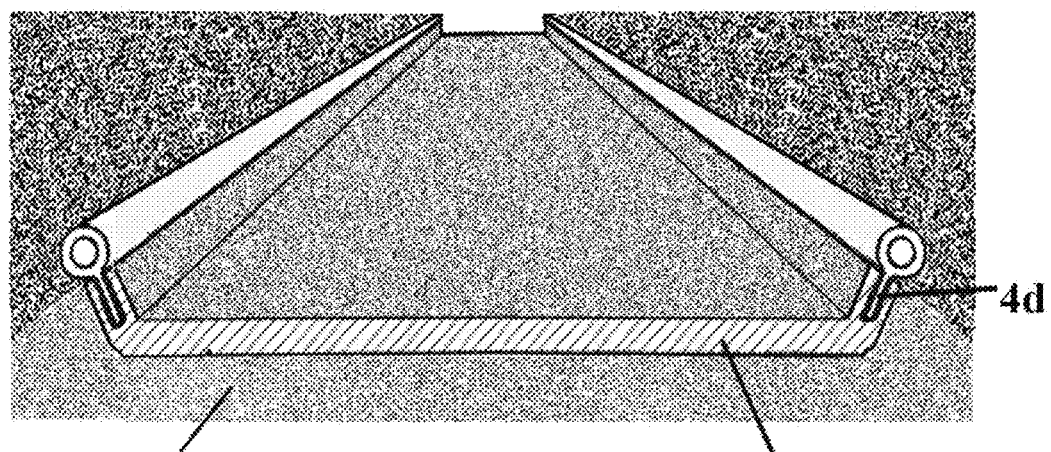
FIG. 15 shows a perspective view of a track similar to that of FIG. 11. This has the soul of the rails partially embedded in the structure or support channel.
Figure 16:
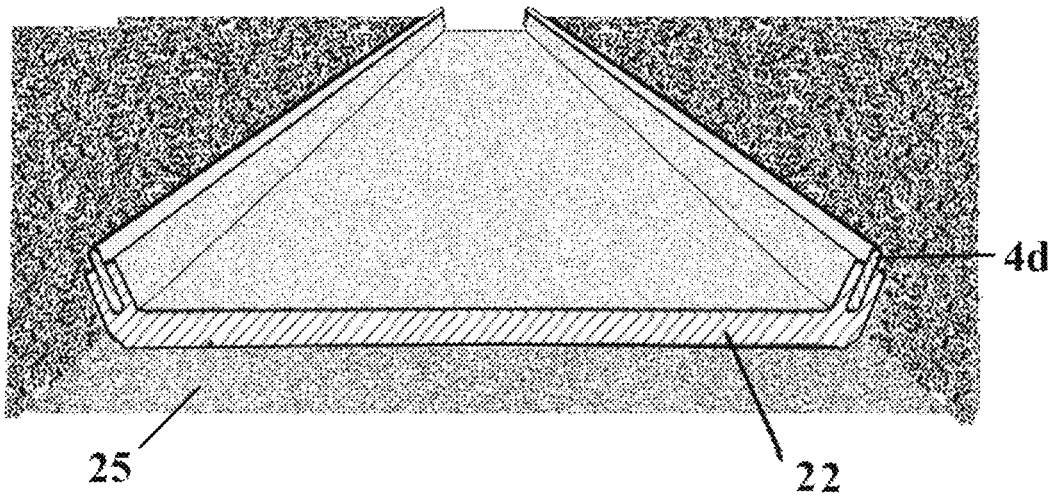
FIG. 16 shows a perspective view of a track similar to that of FIG. 10. This has the soul of the rails partially embedded in the structure or support channel.
Figure 17:
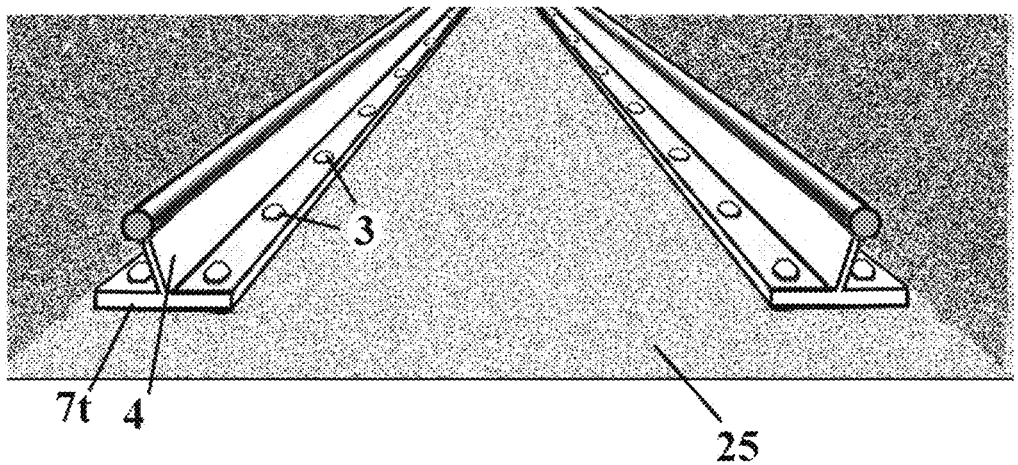
FIG. 17 shows a perspective view of a system of independent rails, without sleepers with their skids fixed to the plate (25).

FIG. 15 shows the structure or channel (22) mounted on the main plate (25) and the rails (4d) tongue and groove with the ends or sides of said channel FIG. 16 shows the structure or channel (22) mounted on the main plate (25) and the rails (4d) tongue and groove with the ends or sides of said channel FIG. 17 shows the independent rails (4) and without sleepers, whose skids (7t) are fastened with the lag screws (3) that are embedded in the main plate (25). The lag screws are shown without the fixing clips but must be applied to prevent loosening them.

Figure 18:
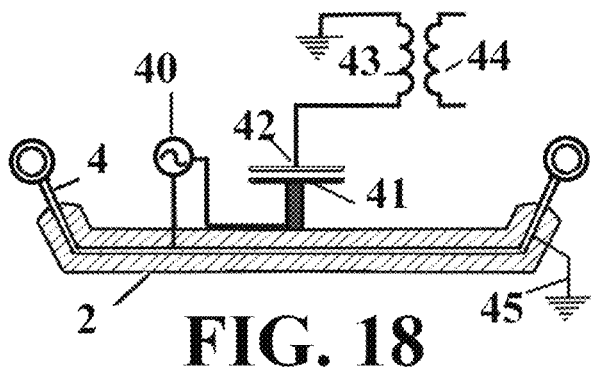
FIGS. 18 and 19 show portions of monolithic channel type structures cross-sectioned with two external current collector circuits using capacitors for their capture or transfer.

FIG. 18 shows a structure or monolithic channel (although made of concrete) (2), the rails (4), the external current generator (40) that applies one end to ground (45)

and the other, or phase, to the fixed plate (41) of the capacitor. The plate (42) of the capacitor moves with the wagon and is applied to the primary (43) of a transformer that reduces and applies the voltage to the secondary (44) and from this it is applied to the rest of the wagon's devices.

Figure 19:
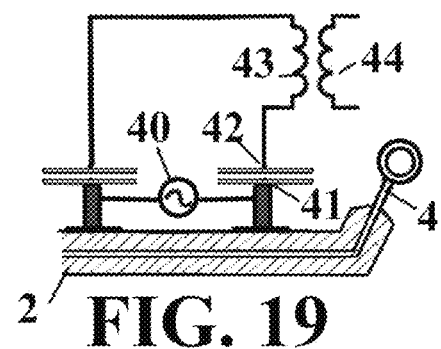

FIG. 19 shows a portion of monolithic structure or channel (2), the rail (4), the external current generator (40) which applies both ends to the fixed plates (41) of the capacitor. The plates (42) of the capacitor move with the wagon and are applied to the primary (43) of a transformer that reduces and applies the voltage to the secondary (44) and from this it is applied to the rest of the wagon's devices.

Figure 20:
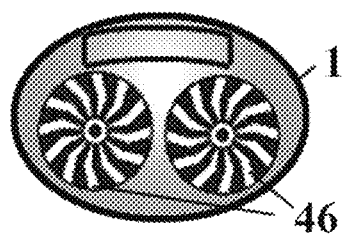
FIGS. 20 and 21 show schematic and frontal views of variants of two types of wagons.
Figure 21:
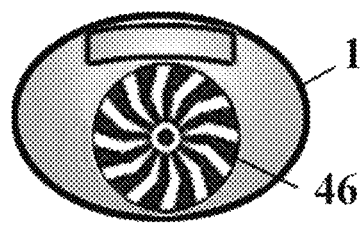

FIG. 20 shows the front of the wagon (1) and a pair of fans (46) in counter-rotation. These fans may be embedded in the wagon FIG. 21 shows the front of the wagon (1) with a single front fan (46). In this case, it uses straightening fins behind the fan, not shown in the figure, which prevent the rotation of the flow and the torque of the wagon.

Figure 22:
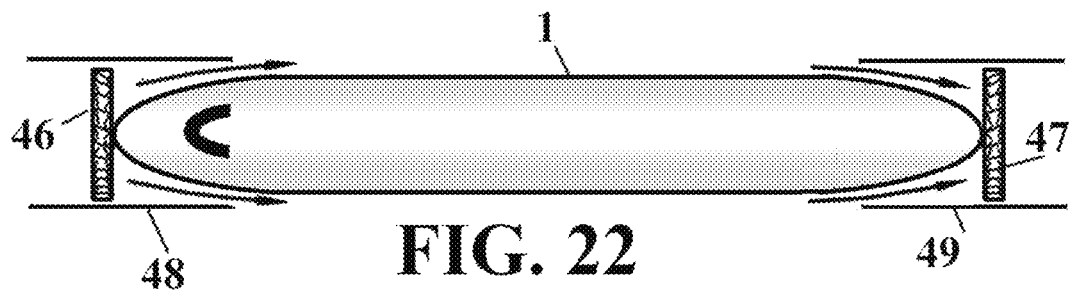
FIGS. 22 and 23 show schematic and plan views of variants of two types of wagons.

FIG. 22 shows the wagon (1), the front fan (46), the rear fan (47). It uses some optional conduits (48 and 49) that facilitate and channel the flow of air. The axes of the fans and their supports are not shown.

Figure 23:
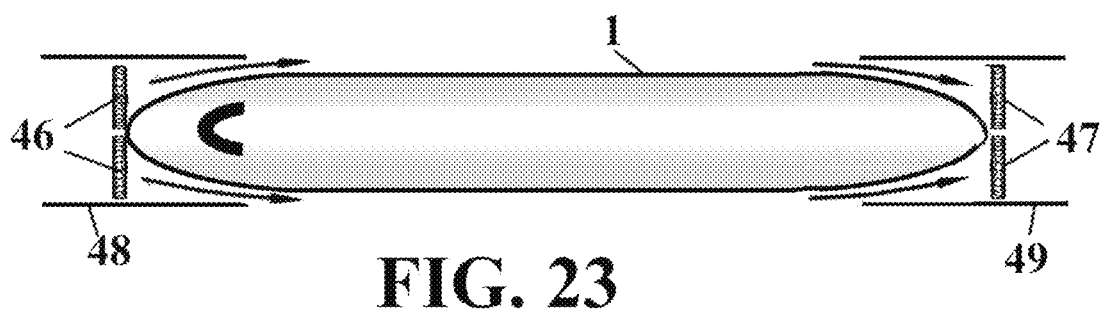

FIG. 23 shows the wagon (1) the pair of frontal fans (46), the rear fans (47). It uses some optional conduits (48 and 49) that facilitate and channel the flow of air. The axes of the fans and their supports are not shown.

Figure 24:
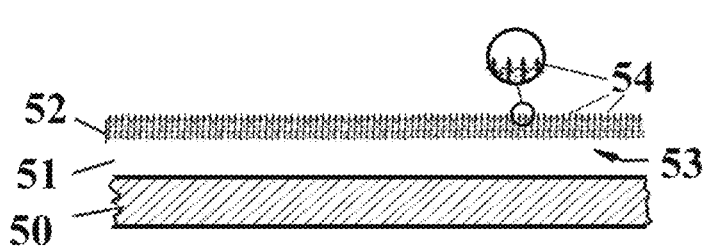
FIG. 24 shows a schematic and partially cross section view of the wall of a car with a friction reduction system using air bubbles.

FIG. 24 shows the main wall of the wagons (50) the external porous wall (52) and between both the pressurized chamber (51) with the air (53), which leaves through the porous plate according to the arrows (54).

Figure 25:
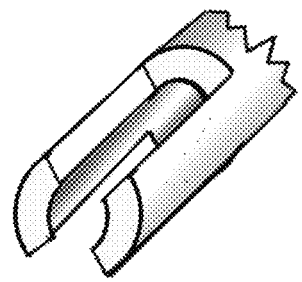
FIGS. 25 and 26 show schematic and perspective views of two end portions of two possible types of rail heads. Which tongue and groove with other similar allowing to correct longitudinal dilatations.

FIG. 25 shows one end of a tubular rail head, which is tongue and groove with a similar one.

Figure 26:
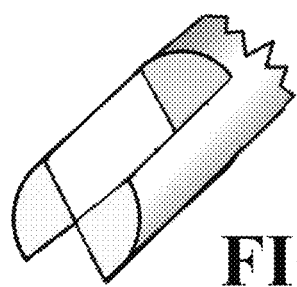

FIG. 26 shows one end of a rail head of compact type, which is tongue and groove with a similar one. Both in this, as in the previous case, the wheels do not accuse their displacement because they tend to rest on the area of the lateral joint.

Figure 27:
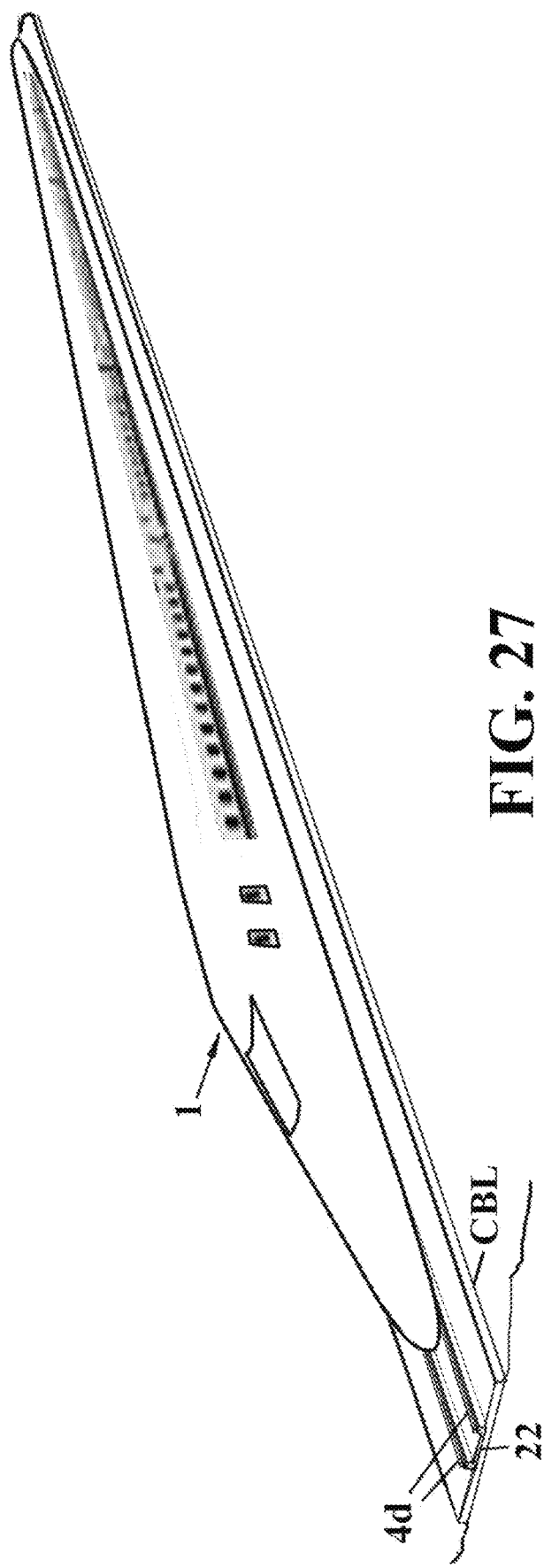
FIG. 27 shows the wagon or train arranged on rails mounted on a concrete support plate.

FIG. 27 shows the train or wagon (1) and the rails (4d) of the structure or channel (22) on the main plate (CBL). In this case the fans are not applied.

The structures or monolithic channels (22) must carry drainage holes not shown in the drawings.

Figure 28:
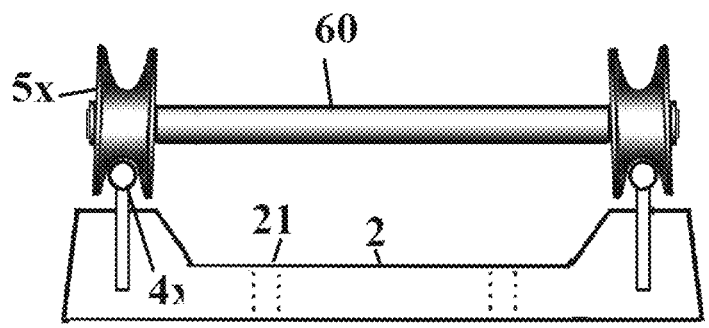
FIG. 28 shows a schematic and partially cross-section view of a pair of pulley wheels joined by an axis and arranged on two vertical rails.

FIG. 28 shows the cross member (2) with the holes (21) for the lag screws, the rails (4x) with their vertical webs embedded in the cross member and the pair of pulley wheels (5x) supported by the shaft (60).

Figure 29:
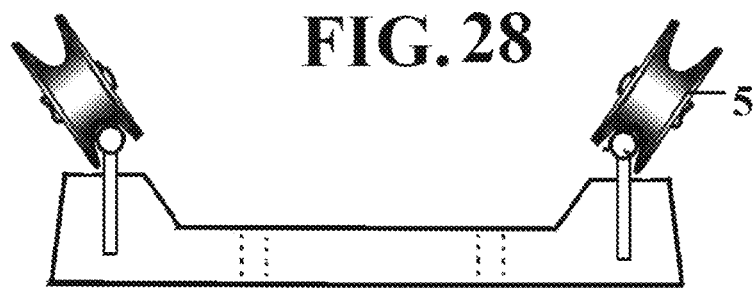
FIGS. 29 and 30 show schematic and partially cross-section views with the same rails of FIG. 28 with independent and inclined pulley wheels.

FIG. 29 shows the same system of rails and sleepers as in FIG. 28 but with independent and inclined pulley wheels (5), converging towards the lower zone.

Figure 30:
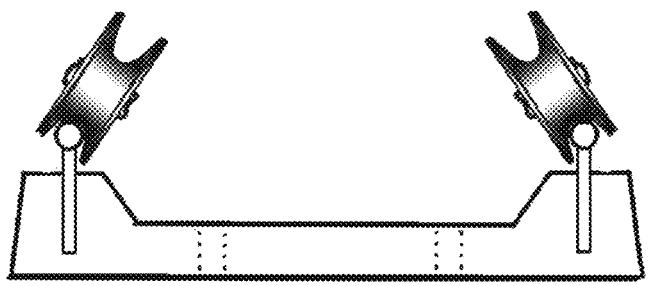
Figure 31:
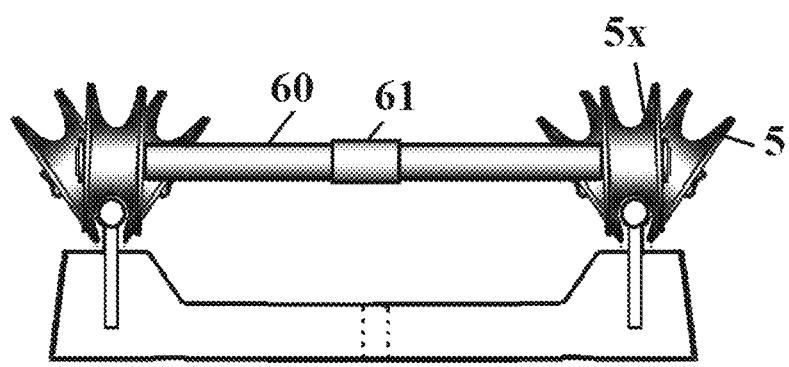
FIG. 31 shows a schematic, front and partially cross-section view of the wheels and rails of FIGS. 28 to 30 seen and used simultaneously.
Figure 32:
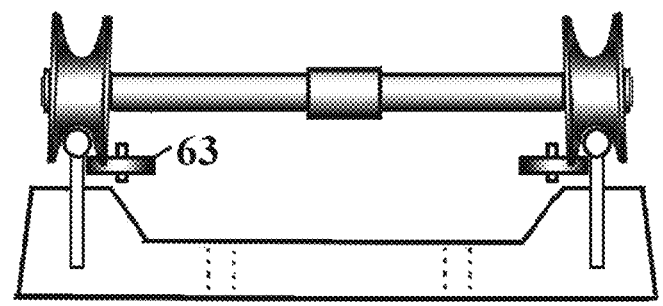
FIG. 32 shows a view similar to that of FIG. 28, but the axle carries an electrically insulated joint and adds side retaining wheels.

FIG. 30 is similar to FIG. 29 but with the inclined wheels converging towards the upper area FIG. 31 carries two pairs of vertical pulley wheels (5x), joined by an axle (60) with an insulating piece (61) in its central area, and several inclined pulley wheels (5) which surround and trap inclined rails, prevent derailment. FIG. 32 is similar to FIG. 28 but adds the side detent wheels (63) that prevent derailment.

Figure 33:
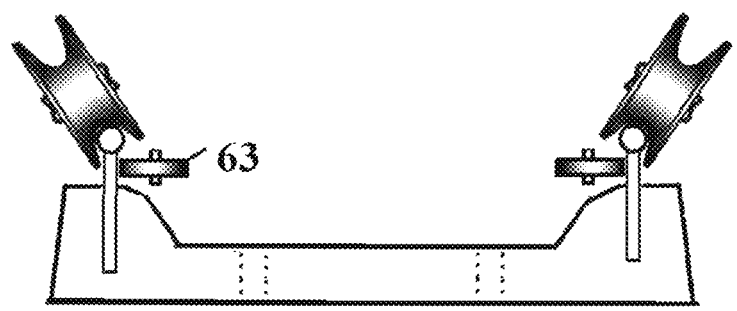
FIG. 33 shows a schematic and partially cross-section view of a system of inclined wheels with lateral stop wheels.
Figure 34:
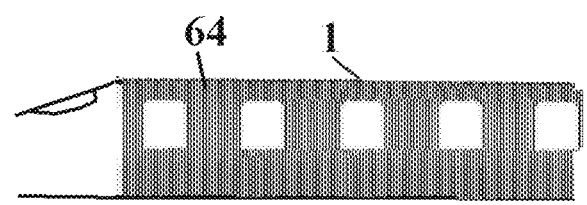
FIG. 34 shows a schematic, side and partial view of a wagon with multiple micro-grooves on its surface.

FIG. 33 is similar to FIG. 29 but adds the side detent wheels (63) that prevent derailment. FIG. 34 shows the wagon 28 with the microgrooves (64) through which air is blown from the inside.

Figure 35:
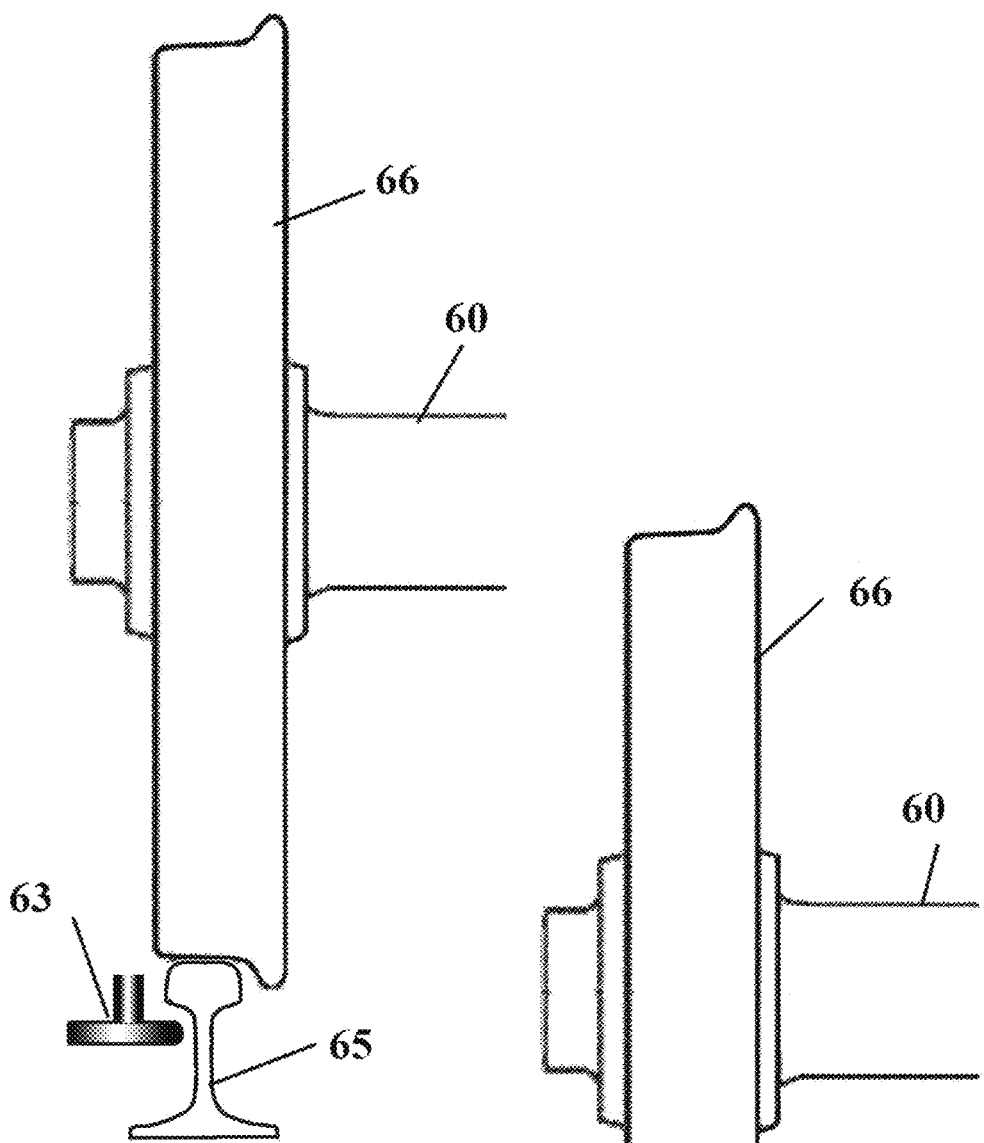
FIGS. 35 to 38 show schematic and partially cross-section views of standard wheel systems with side retaining wheels.

FIG. 35 shows the standard wheel (66) its axis (60) on the standard rail (65) that adds the horizontal retaining wheel (63). You can add the magnetic wheels.

Figure 36:
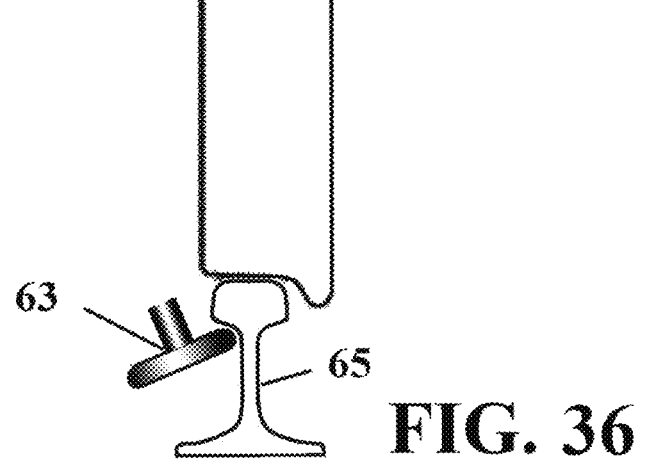

FIG. 36 shows the standard wheel (66) its axis (60) on the standard rail (65) that adds the inclined stop wheel (63). You can add the magnetic wheels.

Figure 37:
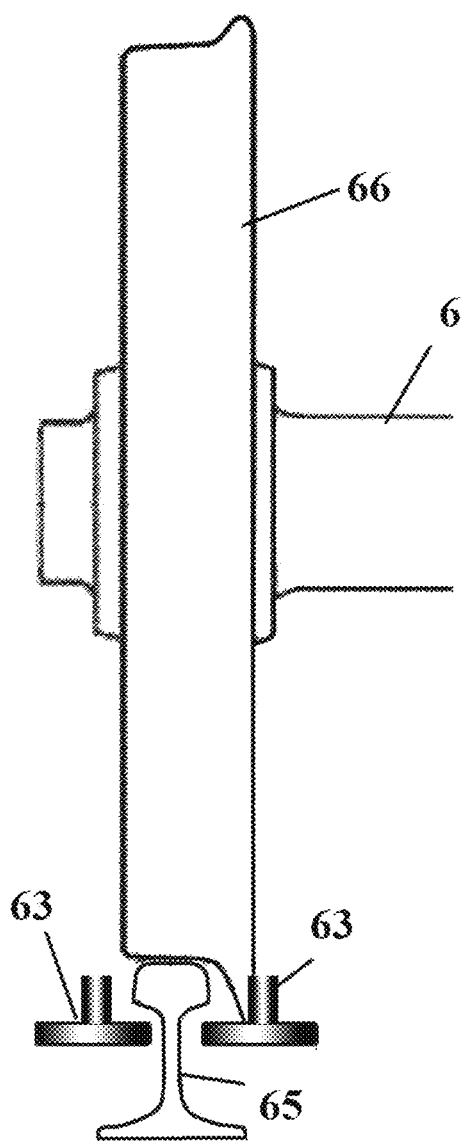

FIG. 37 shows the standard wheel (66) its axle (60) on the standard rail (65) that adds two horizontal stop wheels (63), one on each side.

Figure 38:
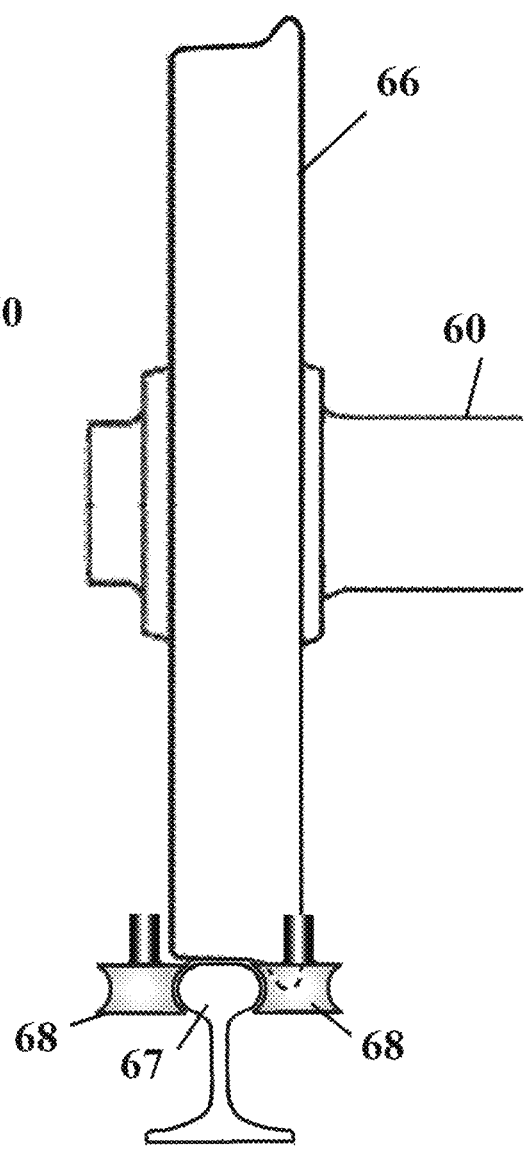

FIG. 38 shows the standard wheel (66) its axis (60) on the head rail (67) with its oval sides, on which the retaining pulley wheels (68) act, one on each side.

Figure 39:
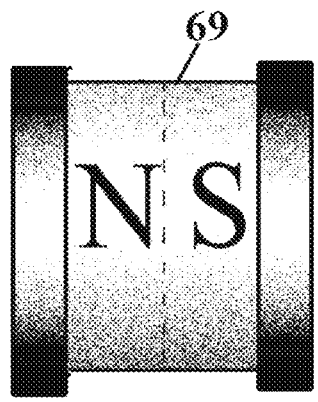
FIGS. 39 and 40 show schematic and side views of two permanent magnet wheels.

FIG. 39 shows the permanent magnet wheel (69) magnetized in the N-S direction parallel to its axis.

Figure 40:
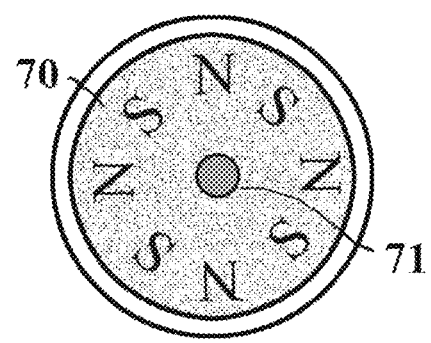

FIG. 40 shows the multiple permanent magnet wheel (70). With its axis of rotation (71).

The invention claimed is:

1. A train system comprising:
a track having two spaced apart rails;
a train wagon having pulley-shaped wheels for rolling on said rails, each of said pulley-shaped wheels having a respective axis of rotation being inclined with respect to horizontal, each of said pulley-shaped wheels having a throat for engaging a corresponding one of said rails, the electrical supply being carried out from the ground and being captured and sent through the rails or through large fixed plates acting as capacitors with others in the lower or lateral area of the wagons, the rails making ground or a second plate is used for ground.

2. A train system comprising:
a track having two spaced apart rails;
a train wagon having pulley-shaped wheels for rolling on said rails, each of said pulley-shaped wheels having a respective axis of rotation being inclined with respect to horizontal, each of said pulley-shaped wheels having a throat for engaging a corresponding one of said rails, said rails are made of ferromagnetic material and use magnetic wheels which attract the wagons against the rails to avoid or reduce a tendency to separate from each other.

3. The train system according to claim 2, wherein said magnet wheels are electromagnets and sensors measure the separation between the wheel-shaped pulleys and the rails, if there is separation the current of the electromagnets increases.

4. A train system comprising:
a track having two spaced apart rails;
a train wagon having pulley-shaped wheels for rolling on said rails, each of said pulley-shaped wheels having a respective axis of rotation being inclined with respect to horizontal, each of said pulley-shaped wheels having a throat for engaging a corresponding one of said rails, a mechanical damping being used and having helical pneumatic or oleo-pneumatic springs.

5. The train system according to claim 4, wherein said pulley-shaped wheels have axles with mechanical or air bearings.

6. The train system according to claim 4, wherein the wagons are built with Kevlar, carbon or glass fibre and aluminium or magnesium alloys, the tracks are made of stainless steel with the head of the rail and the rolling channel of the pulley wheels hardened.

7. The train system according to claim 4, wherein the electrical supply is carried out with batteries or fuel cells.

8. The train system according to claim 4, wherein the rails and pulley-shaped wheels are placed inclined and convergent with each other, with the convergence or divergence towards the lower middle zone.

9. The train system according to claim 4, wherein the rails are placed on the sides of monolithic and continuous concrete structures or channels.

10. The train system according to claim 4, wherein said pulley-shaped wheels have axles supported by grease boxes.

11. A train system comprising:

a track having two spaced apart rails;

a train wagon having pulley-shaped wheels for rolling on said rails, each of said pulley-shaped wheels having a respective axis of rotation being inclined with respect to horizontal, each of said pulley-shaped wheels having a throat for engaging a corresponding one of said rails; and sleepers for holding said rails, said sleepers having grooves for receiving said rails, said grooves setting an inclination angle at which the rails are inclined with respect to the horizontal.

\* \* \* \* \*